United States Patent [19]

Hamilton

[11] 3,931,000

[45] Jan. 6, 1976

[54] COALESCING DIALYSIS

[75] Inventor: Charles Eugene Hamilton, Midland, Mich.

[73] Assignee: The Dow Chemical Company, Midland, Mich.

[22] Filed: Nov. 1, 1972

[21] Appl. No.: 302,838

[52] U.S. Cl. .................................. 210/22; 210/321
[51] Int. Cl.² .......................................... B01D 13/00
[58] Field of Search .......... 210/21, 22, 23, 321, 500

[56] References Cited
UNITED STATES PATENTS

| | | | |
|---|---|---|---|
| 1,885,393 | 11/1932 | Schaack, Jr. | 210/321 X |
| 2,768,977 | 10/1956 | Auvil et al. | 210/21 X |
| 3,225,107 | 12/1965 | Kirkland et al. | 210/500 X |
| 3,228,877 | 1/1966 | Mahon | 210/22 |
| 3,608,729 | 9/1971 | Haseldeh | 210/321 |
| 3,769,206 | 10/1973 | Brown et al. | 210/22 |

*Primary Examiner*—Frank A. Spear, Jr.
*Attorney, Agent, or Firm*—Bruce M. Kanuch

[57] ABSTRACT

Insoluble gases, liquid and solid materials present as the disperse phase in a heterogeneous dispersion are removed by contacting such dispersion with one side of a membrane in which the disperse phase is soluble and on which the disperse phase coalesces and contacting the other side of the membrane with a material which does not permeate or react with the membrane but which reacts with the disperse phase passing through the membrane. The reaction product is such that it does not permeate the membrane. In this manner the driving force for passage through the membrane by the disperse phase is maximized.

6 Claims, No Drawings

COALESCING DIALYSIS

BACKGROUND OF THE INVENTION

Dialysis, i.e. the separation of materials based on differences in chemical potential through contact with a membrane, has been used to remove dissolved inorganic or organic materials from liquid or gaseous solutions, e.g. the artificial kidney machine. The dissolved materials which pass through the membrane are swept away or otherwise removed from the proximity of the membrane to maintain as high a driving force as possible. However, because of relatively low permeation rates through the membrane, such dialysis processes require a large membrane surface area and/or long contact time to permit effective separation to take place and a large volume of sweep fluid resulting in a relatively dilute sweep stream.

In many instances it would be desirable to separate out the disperse phase in a heterogeneous dispersion such as chemical waste streams (e.g. polysubstituted phenolics in an aqueous dispersion) or stack gases. Phase separation has been used but is limited by the ability to detect the interface. Filtration, or even ultrafiltration, has been used in some cases but is limited to relatively large particle size dispersions.

An object of the present invention is to provide a method for removing a disperse phase from a heterogeneous dispersion.

A further object of the present invention is to provide a method for removing a disperse phase from an aqueous dispersion.

Still another object of the present invention is to provide a method of removing a disperse phase from a heterogeneous dispersion wherein the disperse phase so separated is concentrated, recovered and/or converted to a useful material.

Another object of the present invention is to provide a method of removing and recovering polysubstituted phenolics from aqueous waste streams.

SUMMARY OF THE INVENTION

The present method comprises contacting a heterogeneous dispersion with one side of a membrane in which the disperse phase is soluble and on which the disperse phase coalesces and contacting the other side of the membrane with a material which does not permeate or react with the membrane but which reacts with the disperse phase passing through the membrane to form a product which is essentially insoluble in the membrane.

A primary factor in this selective dialysis process is the relationship of the disperse phase desired to be separated and the membrane in contact with the dispersion. The membrane material must be such that the disperse phase forms a thin film or layer on the surface, i.e. coalesces or produces a concentration of the disperse phase at the membrane surface which is greater than that in the bulk dispersion. Thus the disperse phase can be soluble in the bulk medium and yet coalesce in the sense that upon contact with the membrane a higher concentration at the membrane surface exists than in the bulk medium. The disperse phase must have a limited solubility in the membrane.

As the disperse phase passes through the membrane it is reacted with a material to form a product which will not pass back through the membrane.

Thus the present method maximizes the driving force and concentration gradient for the dialysis separation — a layer of disperse phase on one side of the membrane and essentially no unreacted disperse phase on the other side. Such method results in relatively fast permeation rates permitting use of small surface area membranes and/or shorter contact times.

PARTICULAR EMBODIMENTS

The media (material containing the disperse phase) employed in the present invention can be in the gaseous or liquid state and contain one or more disperse phases which are gaseous, liquid or solid. Examples of disperse phases and the media in which they are dispersed include dinitro-orthosecondary-butyl-phenol (solid or liquid), trichlorophenol (solid or liquid), dichlorophenol (vapor), or pentachlorophenol (solid) in water, aqueous waste streams, brines or acids such as 2,4,5 trichloro-phenoxy acetic acid.

The membrane used in the present technique is made from materials generally employed in dialysis process. Membrane materials include polyethylene, chlorinated or sulfonated polyethylene, silicone polymers and fluorocarbons.

The membrane can be in the form of a thin plate or sheet or various other shapes and sizes, or preferably a fine hollow fiber form which has a large surface area per unit volume. Where the hollow fiber form is employed the dispersion can be fed into or around the outside of the fiber.

Standard tests, such as those carried out in the examples herein, can be employed to determine the optimum membrane material for the disperse phase desired to be removed.

The material, gaseous, liquid or solid in form, used to react with the disperse phase passing through the membrane is one which produces a phase which is essentially insoluble in the membrane. This prevents a back pressure of the disperse phase on the membrane. Such reaction product could be recovered and used or treated to regenerate the disperse phase and reactant. For example, sodium hydroxide (in solid form or aqueous solution), sodium methoxide or alkanol amines can be used to react with dinitro-orthosecondary butylphenol, trichlorophenol, dichlorophenol and pentachlorophenol to produce the sodium salt, alkanolamine, or methyl ester of the substituted phenols. Other reactants include methyl through nonyl alkyls and phenyl and biphenyl aryls.

One preferred embodiment of the present method is the treatment of a continuous stream of a dispersion using a membrane, e.g. polyethylene in the form of a tube sheet of fine hollow fibers encased in a container. The dispersion, e.g. an aqueous waste stream containing polysubstituted phenols, such as bromo, nitro, amino, sulfo or chlorophenols, is fed into one end of the container, passed around the outside of the fibers, and removed from the other end of the container. A reactant for the phenols, e.g. NaOH solution, is fed into the hollow fine fibers. The substituted phenols coalesce on the fiber outside surface, and being soluble pass through the fiber to react with the sodium hydroxide to concentrate sodium phenate salts which are insoluble in the membrane. The product is swept out of the system as the NaOH stream is removed from the fiber tube sheet.

Where there is more than one disperse phase to be separated the present method can be repeated thereby removing first one and then another disperse phase using the same or different reactants and membranes.

The following examples are representative of the method of the present invention.

An experimental apparatus was set up wherein a beaker containing the media with the disperse phase was placed on a magnetic stirrer. Into the top of the beaker was placed a bag made of membrane material which was suspended from a ring stand and contained the reactant. Several heterogeneous dispersions were tested using this apparatus. The membrane bag containing the reactant was placed in the heterogeneous dispersion for selected periods of time. The starting concentration in the heterogeneous dispersion was noted and the rate of diffusion through the membrane measured by observing the disappearance of the disperse phase from the dispersion and its appearance in the reactant. Table I gives the results of these experiments.

TABLE I

| Example No. | Media | Disperse Phase | Membrane | Contact Time — Min | Reactant | Rate — $\mu g/in^2$ min |
|---|---|---|---|---|---|---|
| 1 A | waste stream | DNOSBP (1200 mg/l) | PE* with 2% VA** | 30 | 1N NaOH | 30.75 |
| 1 B | | | | 180 | 1N NaOH | 48.8 |
| 1 C | | | | 1380 | 50% NaOH | 11.5 |
| 2 | water | TCP (1000 mg/l) | PE with 2% VA | 240 | 10% NaOH | 41.6 |
| 3 | water | dichlorophenol (367 mg/l) | PE with 2% VA | 1440 | 10% NaOH | 2.6 |
| 4 A | water | pentachlorophenol (100 mg/l) | PE with 2% VA | 380 | 10% NaOH | 2.54 |
| 4 B | | | | 385 | | 2.56 |
| 4 C | | pentachlorophenol (200 mg/l) | | 625 | | 3.17 |
| 5 | waste stream | DNOSBP (2500 mg/l) | PE with 2% VA | 2880 | alkanolamine | 162 |
| 6 | waste stream | DNOSBP (2100 mg/l) | PE with 2% VA | 4320 | 10% NaOH | 1.49 |

*Polyethylene
**Vinyl acetate
DNOSBP = dinitro-ortho secondary-butyl-phenol
TCP = trichlorophenol Several other experiments were run in which the membrane bag contained the heterogeneous dispersion and the beaker contained the reactant.

Table II indicates the results of these experiments.

TABLE II

| Example No. | Media | Disperse Phase | Membrane | Contact Time | Reactant | Rate — $\mu g/in^2$ min |
|---|---|---|---|---|---|---|
| 7 | waste stream | DNOSBP (1500 mg/l) | PE with 2% VA | 2880 | 10% NaOH | 9.0 |
| 8 A | waste stream | DNOSBP (14200 mg/l) | PE with 2% VA | 1440 | 10% NaOH | 9.65 |
| 8 B | | | | 240 | 10% NaOH | 28.6 |
| 8 C | | | | 1020 | | 11.4 |

A third experimental apparatus was used to demonstrate the method of the present invention. A bundle of fine hollow fibers of a membrane material was enclosed in a tube having feed and outlet ends. The heterogeneous dispersion was fed on the outside of the fibers. The reactant was fed through the inside of the fibers. Table III shows the results of some experiments run using this apparatus.

TABLE III

| Example No. | Media | Disperse Phase | Membrane | Contact Time — Min | Reactant | Rate — $\mu g/in^2$ min |
|---|---|---|---|---|---|---|
| 9 A | water | DNOSBP (25 mg/l) | polyethylene | 120 | 10% NaOH | 15.3 |
| 9 B | | DNOSBP (22.7 mg/l) | | 60 | | 14.6 |
| 10 | water | DNOSBP (100 mg/l) | polyethylene with 2% VA | 20 | 10% NaOH | 19.7 |
| 11 A | waste stream | DNOSBP (1910 mg/l) | polyethylene with 2% VA | 100 | 10% NaOH | 40 |
| 11 B | | | | 10 | 10% NaOH | 40 |
| 12 A | waste stream | SNOSBP* (5000 mg/l) DNOSBP (25,000 mg/l) | sulfonated polyethylene | 750 | 1N NaOH | 14.6 0.005 |
| 12 B | | SNOSBP (2 mg/l) DNOSBP (13.6 mg/l) | sulfonated polyethylene | 750 | 1N NaOH | 4.6 0.005 |

*sulfonitro-orthosecondary-butyl phenol

What is claimed is:

1. A process comprising:
   a. contacting a heterogeneous dispersion in which the disperse phase is a polysubstituted phenolic compound with one side of a membrane in which the disperse phase is soluble and on which the disperse phase coalesces; and
   b. contacting the opposite side of the membrane with a membrane insoluble reactant for the disperse phase whereby the disperse phase is reacted to produce a material which is essentially insoluble in the membrane without the build-up of a back pressure against said opposite side of said membrane.

2. The process of claim 1 wherein the polysubstituted phenolic compound is dinitro-orthosecondary-butyl-phenol.

3. The process of claim 2 wherein the reactant is sodium hydroxide.

4. A process for removing one or more polysubstituted phenolics from an aqueous waste stream, wherein the phenolics are present in amounts greater than their solubility limit, which comprises:
 a. feeding said stream past a membrane in which the phenolics are soluble and on which the phenolics coalesce, thereby passing said phenolics through said membrane; and
 b. feeding on the opposite side of the membrane a reactant whereby the phenolics passing through the membrane are reacted to produce a material which is essentially insoluble in the membrane.

5. The process of claim 4 wherein the reactant is sodium hydroxide.

6. The process of claim 4 wherein the polysubstituted phenolics are selected from the group consisting of bromo, nitro, amino, sulfo or chlorophenols.

* * * * *